INVENTOR.
ROBERT A. FLOWER
GUS STAVIS

INVENTOR.
ROBERT A. FLOWER
GUS STAVIS
BY
H. A. Mackey
ATTORNEY.

United States Patent Office 3,360,987
Patented Jan. 2, 1968

3,360,987
OPTICAL RADAR SYSTEM
Robert A. Flower, White Plains, and Gus Stavis, Briarcliff Manor, N.Y., assignors to General Precision, Inc., a corporation of Delaware
Filed July 3, 1964, Ser. No. 380,156
16 Claims. (Cl. 73—71.3)

The present invention relates to an optical radar system for detecting and analyzing vibrations of a remote body or surface. More particularly the invention described herein is a coherent optical radar system in which a generating means, such as a laser, is employed to generate and transmit a continuous wave (cw) of electromagnetic energy toward a remote target. The system provides for receiving the reflected transmitted cw signal and for detecting and translating the information of the reflected or echo signal in terms of the character of the vibrations or motion of the remote body.

The use of a cw signal at optical frequencies for detecting vibrations of a remote body has heretofore presented problems. In microwave and radio frequency radar systems a stable local oscillator may be conveniently used to provide a reference signal used for heterodyning with the echo signal for the purpose of recovering echo phase information. At optical frequencies this arrangement is difficult to duplicate. Thus a cw coherent optical radar system employing one signal generating means is a preferred configuration.

Since a reference signal in the form of part of the transmitted signal is readily obtainable, a system of homodyning, mixing the transmitted signal and the echo signal, is used in the subject invention. Homodyning is a process of mixing. Homodyning is a process of mixing an echo signal and part of the transmitted signal so as to provide, amongst other things, a signal which varies at or about zero frequency. Such variable signal is a function of the vibrations or movements of the remote body or surface from which the transmitted signal was reflected.

Simple homodyning of this kind presents the problem of foldover, where the modulation sidebands on the echo signal, which are the functions of the vibrations or motion of the remote body or surface, fold about the zero frequency. The folding of the sidebands about zero frequency distorts the characteristics found on the echo signal. This distortion prevents true measurement of the echo signal characteristics.

Our novel approach avoids the problem of providing a separate local oscillator at the optical frequency. Thus only one laser is employed in the cw optical radar system and in a manner which avoids the problem of fold-over of the echo characteristics about the zero frequency.

Our novel cw optical radar system involves homodyne mixing of the transmitted signal and the echo signal in two quadrature channels followed by quadrature modulation with an intermediate frequency signal of substantially lower frequency than the transmitted frequency but substantially higher frequency than any of the characteristics found on the echo signal and summing of the modulation products before final demodulation. With this new approach, the echo signal is reconstructed at an intermediate frequency so that the exact quality of the characteristics found on the echo signal, is preserved.

It is an object of the present invention to provide a cw optical radar yntem for detecting and analyzing vibrations of a remote body or surface.

Another object is to provide a cw radar system operating at frequencies in the optical range for detecting and analyzing vibrations of a remote body or surface in which the received echo signal is homodyned at the carrier wave frequencies in two quadrature channels and quadrature modulated at an intermediate frequency for reconstructing the echo signal, at an intermediate frequency.

A further object is to provide an optical radar system for detecting and analyzing vibrations or motion of a remote body or surface in which the optical frequency signal generator serves for transmitting the optical frequency signal and for providing a reference signal thereby avoiding the necessity of providing a second local oscillator at the optical carrier frequency.

A further object is to provide an optical radar system in which the echo signal is homodyned in two quadrature channels and the echo signal is reconstructed at an intermediate frequency and is analyzed and translated by circuit elements employing conventional frequency modulation and demodulation techniques.

These and other objects will become apparent from reading the following description of our invention and the principles related thereto with reference to the accompanying drawings in which.

Figure 1:
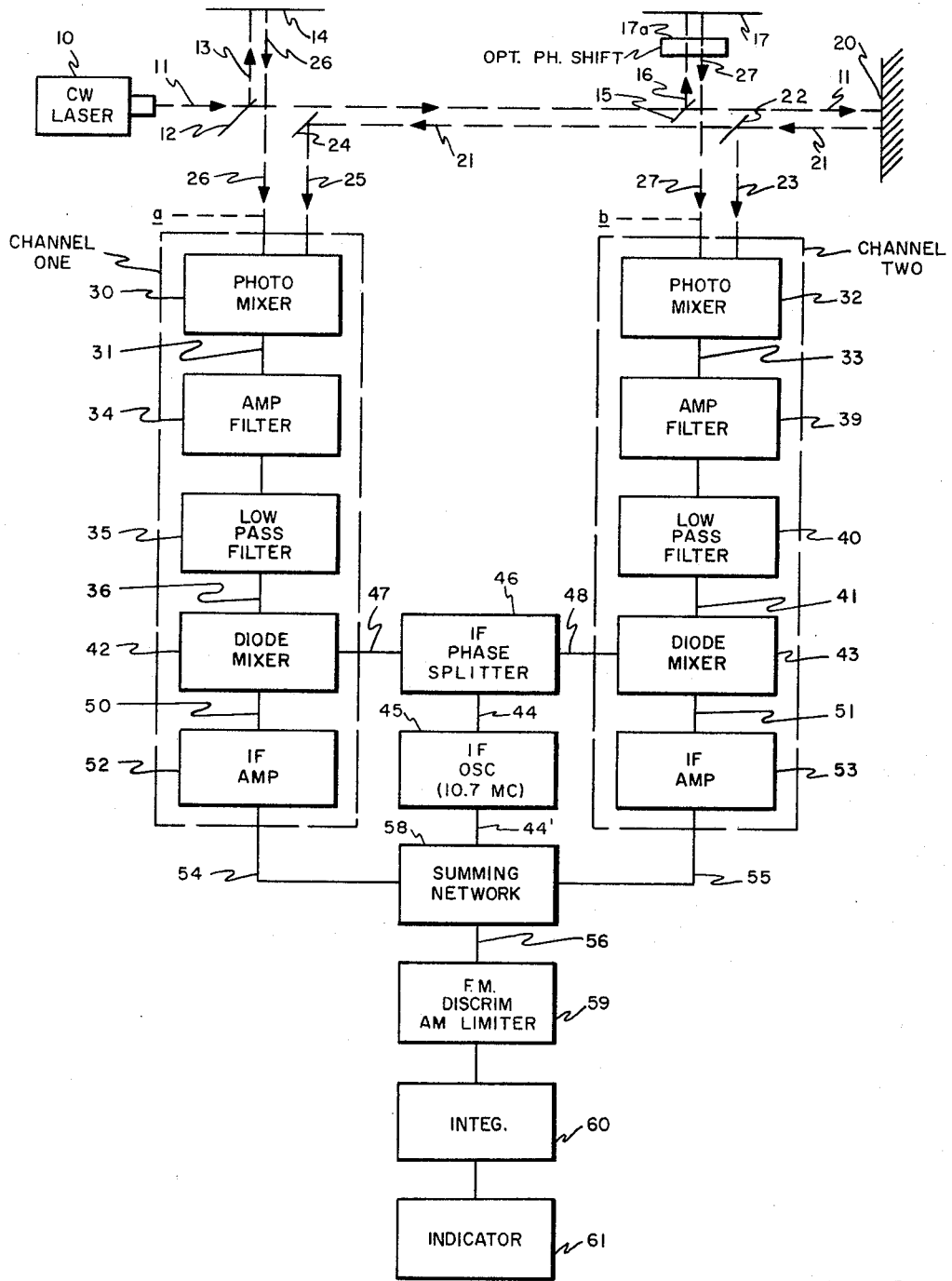
FIG. 1 is a block diagram of the preferred form of the invention.

Referring in detail to the block diagram of FIG. 1, an optical frequency continuous wave (cw) signal generator, represented by block 10, cw laser, provides a transmitted signal in the form of a light beam or column. The transmitted beam is represented by broken line 11.

For the purpose of providing a convenient and comprehensive description of the functions and principles relating to our invention, mathematical equations shall be used to describe the various signals and functions of certain of the components of our system. With this in mind let it be assumed that the signal output of the laser 10 has an optical carrier frequency of $^\omega/_{2\pi}$.

The light beam 11 is directed to, and illuminates the target 20, which is assumed to be vibrating. An echo or reflected signal, represented by broken line 21, is reflected from the target and includes thereon a phase modulation component, which shall be referred to as $\phi(t)$, which is a function of the propagation path length changes of the signal arising from the vibrational motion of the target, with respect to the source of the transmitted signal. An amplitude modulation component, which shall be referred to as $A(t)$, is also present on the echo signal. Thus, at any one time the echo signal may be represented as the transmitted carrier signal, modified by the phase modulation component, plus the amplitude modulation component, at that time.

Since the frequency of the transmitted carrier signal may be represented as $^\omega/_{2\pi}$, then the instantaneous value of the transmitted signal at time $t$ may be represented as:

$$\sin \omega t \qquad (1)$$

The instantaneous value of the echo signal at time $t$ may be represented as:

$$A(t) \sin (\omega t + \phi(t)) \qquad (2)$$

In our system the transmitted carrier signal serves as a reference signal; therefore beam splitters 12 and 15 are provided, each of which extract a sample of beam 11 as indicated by broken line 13 and broken line 16. It should be noted that for convenience of illustration the various beams have been separated so as to more clearly represent the operations and processes within our system. However, it should be realized that some of the beams, for example, beams 13 and 26, 16 and 27, 26 and 25, 27 and 23, and 21 and 11, where these beams are shown parallel to each other, would preferably be in coincidence and be projected along substantially the same axis. It should further be appreciated that each pair of beam splitters 12 and 24, and 15 and 22 may each be the same beam splitter, but each is separated and shown as individual beam splitters, for convenience and clarity of description.

It should also be noted that reflectors or mirrors 14 and 17 would reflect their respective beams from common points, respectively so that the beams 13 and 26, associated with reflector 14, and beams 16 and 27 associated with reflector 17 would each be in coincidence respectively. Further, since the beam splitters 12 and 24 may be one beam splitter and 15 and 22 may be another one beam splitter then the beams 26 and 25 would be applied to the same point or area as inputs and the beams 27 and 23 would be applied to another same point or area as inputs. The target 20 reflects the beam 11 as 21 so that 11 and 21 would also be in coincidence, having a substantially common axis.

With the above in mind, it will be seen that beam splitter 12 deflects part of beam 11, as indicated by 13 to a mirror or reflector 14. The reflected beam from mirror 14 is represented as beam 26. Beam splitter 15 deflects part of beam 11, as indicated by 16 to a mirror or reflector 17. Beam 16 is represented as passing through 17a, Opt. Ph. Shift, representing a light beam phase shifter. The purpose of 17a is to shift the phase of beam 16 and thus beam 27, as will be more fully described below. An alternate method of providing phase shift of the beam 16, is by positioning the mirror or reflector 17 so as to lengthen or shorten the path length of the beams 16 and 27. Beam 16 is reflected from mirror 17 whence it becomes beam 27.

The carrier beam 11 illuminates the target 20 which reflects the signal as echo beam 21. Beam 21 is split by beam splitter 22 as indicated by beam 23 and the beam splitter 24 deflects beam 21 as indicated by beam 25.

In order to explain the desired phase relationships among the signal and reference beams 23, 25, 26 and 27, the points $a$ and $b$ are arbitrarily selected. It will be found that as between the echo signals 25 and 23 there may be a fixed phase difference. This may be caused by the difference in path lengths of the signals. This phase difference is measurable and let it be assumed that such phase difference between beam 25 and beam 23 at points $a$ and $b$ respectively may be represented by $\theta$.

The phase shifter, either 17a or, in the alternative, the position of reflector 17 is adjusted so that the phase of beam 26 at point $a$ differs from the phase of beam 27 at point $b$ by the angle $\theta + \pi_2$. This is possible since phase shifter 17a affects only beam 27 (and, also, 16) and is not in the paths leading to beams 25, 26 and 23.

With such arrangement the operation of the receiver is not greatly dependent upon the relative positions of the laser, the photomixers, and the target. After initial alignment to establish the proper or desired phase relationship within the network, the path lengths external to the network become noncritical.

With the desired phase alignment accomplished the beam 26, at point $a$ may be represented as:

$$\sin \omega t \qquad (3)$$

and the beam 27 at point $b$ may be represented as:

$$\cos (\omega t + \theta) \qquad (4)$$

In other words it may be said that the reference beams are in quadrature displacement. Further, since points $a$ and $b$ were arbitrarily selected, they could also be chosen so as to make the phase difference equal to zero. Then $\theta$ becomes zero.

Thus the echo signals 25 and 23 at points $a$ and $b$, respectively, each may be referred to as:

$$A(t) \sin (\omega t + \phi(t)) \qquad (5)$$

The block diagram shows two channels, Channel One and Channel Two, in broken line blocks. Each channel includes a photomixer, an amplifier-filter, a low-pass filter, a diode mixer and an IF amplifier, each channel providing an output respectively to a summing network. A common intermediate frequency (IF) oscillator (osc) provides an output signal to an IF phase splitter which provides IF signals in phase quadrature, with respect to each other, to the respective diode mixers. Thus the signal inputs to the diode mixers may operate to add to the phase shift between the reference signals so as to provide a phase shift of 180° or may subtract from the phase shift between the reference signals so as to substantially eliminate the phase difference initially developed by 17a or, in the alternative, 17. The intermediate frequency signal in its unshifted form, is applied to the summing network to serve as a carrier signal.

Referring to the input signals to Channel One, the signals 26 and 25 or, $$\sin \omega t + A(t) \sin (\omega t + \phi(t)) \qquad (6)$$

are applied to the photomixer 30.

Referring to the input signals to Channel Two, the signals 27 and 23 or, $$\cos \omega t + A(t) \sin (\omega t + \phi(t)) \qquad (7)$$

are applied to the photomixer 32.

The photomixer, which may be a photomultiplier or other type of photodetector may be in the conventional form of photosensitive device, which provides conversion of light to photocurrent, and current multiplication.

For a comprehensive description of the functions and processes of a photodetector, reference may be made to an article, "Evaluating Light Demodulation" by D. E. Caddis and B. J. McMurtry, on pages 54 to 60 of the McGraw-Hill publication "Electronics," April 6, 1964 issue. The pages of the article particularly applicable, are pages 55 and 56.

Referring again to the optical inputs to Channel One, the following equations may be set forth:

$$F_1 = k\sqrt{P_0} \sin \omega t \qquad (8)$$

and $$F_2 = k\sqrt{P_s(t)} \sin (\omega t + \phi(t)) \qquad (9)$$

where $F_1$ equals the electromagnetic field strength of the optical reference beam 26; $F_2$ equals the electromagnetic field strength of the optical echo beam 25; $P_0$ is the effective reference beam power falling on the face of the phototube; $P_s(t)$ is the effective incident echo optical power falling on the face of the phototube and $k$ is a constant related to the impedance of free space.

Thus, $$i = \rho(F_1 + F_2)^2 \qquad (10)$$

Where $i$ is the current emitted from the photocathode; $\rho$ is the responsivity of the photocathode in amperes per watt.

Therefore, $$e_{31} = iR_L = \rho R_L (F_1 + F_2)^2 \qquad (11)$$

Where $e_{31}$ is the output of the phototube and $R_L$ is the terminating load of the phototube.

Thus, $$e_{31} = \rho R_L [k\sqrt{P_s(t)} \sin (\omega t + \phi(t)) + k\sqrt{P_0} \sin \omega t]^2 \qquad (12)$$

Let:

$$\rho R_L k\sqrt{P_s(t)} = A(t)$$

and $$\rho R_L k\sqrt{P_0} = 1$$

then $$e_{31} = \{\sin \omega t + A(t) \sin [\omega t + \phi(t)]\}^2 \qquad (13)$$

Relative to the optical inputs to Channel Two, a corresponding equation may be drawn except that $F_1$ the field strength of beam 27 would be represented as:

$$F_1 = k\sqrt{P_0} \cos \omega t \qquad (14)$$

while the term for $F_2$ corresponding to signal beam 23 would be the same as the term for signal beam 25.

Thus the output 31 of photomixer 30 may be a voltage having a value as $e_{31}$ above (Equation 13) and the output 33 of photomixer 32 may be a voltage having a value $e_{33}$:

$$e_{33} = \{\cos \omega t + A(t) \sin [\omega t + \phi(t)]\}^2 \quad (15)$$

Referring to the signal output 31 of photomixer 30 the equation may be expanded to:

$$e_{31} = \{\sin \omega t + A(t) \sin [\omega t + \phi(t)]\}^2$$
$$= (\sin \omega t)^2 + 2A(t) \sin \omega t \sin [\omega t + \phi(t)]$$
$$+ \{A(t) \sin [\omega t + \phi(t)]\}^2 \quad (16)$$

The term $(\sin \omega t)^2$ contains a D.C. term and the second harmonic of the optical or transmitted carried frequency and is not accepted by the amplifier filter, 34. The term $\{A(t) \sin [\omega t + \phi(t)]\}^2$ may be ignored because $P_s(t)$, the echo signal power, is substantially smaller than $P_o$, the reference beam power, as a result of propagation losses. Hence. $A(t)$ which equals $\rho R_L k \sqrt{P_s(t)}$ is much smaller than unity, and $[A(t)]^2$ becomes negligibly small. The cross-product term $2A(t) \sin \omega t \sin [\omega t + \phi(t)]$ is the term of interest since this term includes the characteristics of the vibrations of the target in a value sufficiently high as to be processed. The term of interest may be expressed as:

$$2A(t) \sin \omega t \sin [\omega t + \phi(t)]$$
$$= A(t) \{-\cos [2\omega t + \phi(t)] + \cos [\phi(t)]\} \quad (17)$$

Signal 31 is applied to amplifier-filter, block 34, which amplifies the signal and filters out the high frequency components, $2\omega t$. Low-pass filter 35 further filters the signal. Thus the signal at 36 may be expressed as:

$$e_{(36)} = A(t) \cos [\phi(t)] \quad (18)$$

Thus the characteristics on the echo signal, which are a function of the vibrational motions of the target, as expressed in mathematical equations have been isolated in Channel One at 36.

The signal output 33 of photomixer 32, the result of mixing signals 27 and 23, has been expressed above in Equation 15. The cross-product term, the term of interest, may be obtained in the same manner as shown for obtaining the cross-product term of signal $e_{31}$. The equivalent cross-production term for signal 33 ($e_{33}$) may be represented as:

$$A(t) \{\sin [2t + \phi(t)] + \sin \phi(t)\} \quad (19)$$

The term of interest developed in the Channel Two photomixer 32 is applied to amplifier-filter 39 and low-pass filter 40 by which the high frequency components are attenuated. The components 39 and 40 of Channel Two serve the same functions in Channel Two as components 34 and 35 serve in Channel One, so that the signal 41 may be expressed as:

$$e_{(41)} = A(t) \sin [\phi(t)] \quad (20)$$

Thus the characteristics on the echo signal, which are a function of the vibrational motion of the target, as expressed in mathematical equations have been isolated in Channel Two at 41.

The signal 36 is applied to diode mixer 42 and the signal 41 is applied to diode mixer 43.

Also applied to diode mixer 42 is the IF reference signal 47, with IF reference signal 48 being applied to diode mixer 43.

As previously described, an intermediate frequency signal is developed in IF oscillator, block 45. We employ a stable oscillator providing an output signal of 10.7 megacycles (10.7 mc.) since such oscillator is readily available and the frequency of the signal is sufficiently high so as to be substantially above the highest frequency of the characteristics which may normally be found on the echo signal as a result of the vibration of the target 20, and sufficiently low so as to be substantially lower than the frequency of the carrier signal. Further, the frequency of 10.7 mc. is a convenient frequency to use because of the ready availability of demodulation equipment.

It should be pointed out that the 10.7 mc. signal serves as an intermediate frequency signal and intermediate frequency signals of other frequencies may be used, as desired, so long as the principles presented herein are maintained. It is desirable, though not necessary, that the frequency of the intermediate frequency signal to be at least double, or in excess of double, the frequency of the highest normally expected sideband frequency in the echo signal.

The frequency of the signal output 44 of the IF oscillator 45 may be referred to as:

$$m/2_\pi$$

This signal is applied to the IF phase splitter, block 46, which provides quadrature output signals 47 and 48, which may be represented as:

$$e_{(47)} = \sin mt \quad (21)$$

and $$e_{(48)} = \cos mt \quad (22)$$

The signals 47 and 36 are applied to the diode mixer 42 which provides an output 50 which may be represented as:

$$e_{(50)} = [A(t) \cos [\phi(t)] + \sin mt]^2$$
$$= [A(t)]^2 \cos^2 [\phi(t)] + 2A(t) \cos [\phi(t)]$$
$$\sin mt + \sin^2 mt \quad (23)$$

The signals 48 and 41 are applied to the diode mixer 43 which provides an output 51 which may be represented as:

$$e_{(51)} = [A(t) \sin [\phi(t)] + \cos mt]^2$$
$$= [A(t)]^2 \sin^2 [\phi(t)] + 2A(t) \sin [\phi(t)]$$
$$\cos mt + \cos^2 mt \quad (24)$$

Each of the signals 50 and 51 are applied to IF amplifiers 52 and 53 respectively. As seen previously, $A(t)^2$ is an infinitesimal and therefore the first term of both Equations 23 and 24 may be neglected. Also, $\sin^2 mt$ and $\cos^2 mt$ lead to D.C. and double frequency outputs. During amplification each of the respective signals are effectively filtered thus eliminating D.C. and double frequency components so that the signal 54 may be expressed as:

$$e_{(54)} = 2A(t) \sin mt \cos [\phi(t)] \quad (25)$$

and the signal 55 may be expressed as:

$$e_{(55)} = 2A(t) \cos mt \sin [\phi(t)] \quad (26)$$

Expansion of the latter two signal equations may be expressed as:

$$e_{(54)} = A(t) \{\sin [mt + \phi(t)] - \sin [mt - \phi(t)]\} \quad (27)$$

and $$e_{(55)} = A(t) \{\sin [mt + \phi(t)] + \sin [mt - \phi(t)]\} \quad (28)$$

As previously described the D.C. term representing the cross-product of the reference signal and the echo signal was attenuated by the filter networks in each channel so that the signals 36 and 41 are the isolated echo information signals with carrier information suppressed. By mixing the echo information signals 36 and 41 with the phase shifted intermediate frequency signals 47 and 48 respectively two signals 50 and 51 are obtained each of which include the echo information on the intermediate frequency signal, each intermediate frequency signal shifted in phase with respect to each other.

The signals 54 and 55 are the amplified signals 50 and 51 respectively.

It will be appreciated that the signals 54 and 55 may be added or summed, as by the summing network, block 58. This will provide a signal which is the echo information reconstructed in amplitude and frequency modulation form at the intermediate frequency level. In order to substantially reconstruct the echo signal, the carrier, which has previously been suppressed by the action of the circuit elements already described, must be reinserted. For the purpose of providing the required carrier frequency signal the output 44', which is substantially the same output as 44 of block 45, is also applied to the summing network 58 so that the signals 54, 55 and 44' are summed. Since the signal 44' is substantially unshifted and is of the intermediate frequency value, the signal 44' serves as the carrier signal, thereby providing a signal 56, the summed signal, which is the reconstructed echo signal at the intermediate frequency level.

The use of the intermediate frequency signal 44' as a carrier signal for the reconstructed echo signal is convenient since the signal output is readily available. However, in practicing our invention another intermediate frequency source may be used for a carrier signal, if desired, so long as the carrier signal is substantially in phase and frequency to the intermediate frequency signal used for mixing with the isolated echo signals in both channels.

Relative to the summing of the signals 54 and 55, it will be found that the sum of the signals may be represented as the sum of Equations 27 and 28 or, $$e_{(56)} = 2A(t) \sin [mt + \phi(t)] \qquad (29)$$

The amplitude modulation components on the reconstructed signal may be eliminated by a conventional limiter and the frequency modulation components may be recovered by conventional frequency demodulation techniques.

This may involve the use of a frequency modulation discriminator, such as represented by block 59, which represents both the amplitude modulation limiter (AM limiter) and the frequency modulation discriminator (FM discrim).

An integrator, such as represented by block 60 (Integ.) may be employed so as to provide an output representing the instantaneous position of the target and this latter output may be applied to an indicator, such as 61 which may be a meter or recorder. A transducer, such as a speaker or set of earphones, may be used so as to provide an audible indication of the vibrations of the target, if desired.

Figure 2:
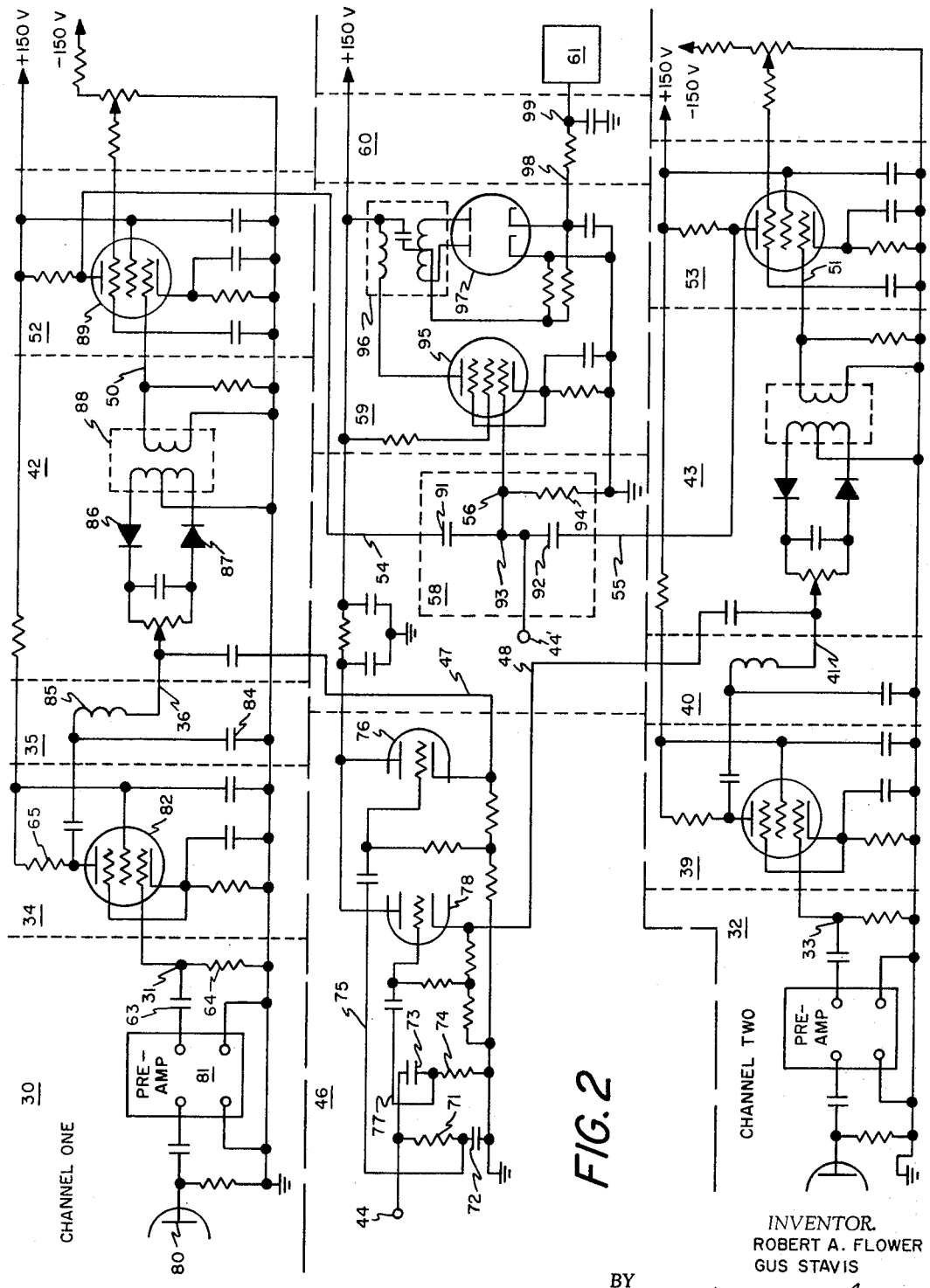
FIG. 2 is a circuit diagram of part of the block diagram of FIG. 1.

Referring to FIG. 2, a circuit diagram illustrating part of the circuitry which is represented in block form in FIG. 1 is presented. The circuit diagram of FIG. 2 is marked off with broken lines so as to indicate Channel One and Channel Two. Between the marked off channels, a circuit which may be employed for a phase splitter, a summing network, a limiter and FM discriminator is shown.

It will be noticed that the circuit labeled Channel One is a substantial duplication of the circuit labeled Channel Two. Therefore the circuit functions of Channel One will be described and such description should be considered a description of the circuit functions of corresponding parts of Channel Two.

Similar reference characters are used as between FIG. 1 and FIG. 2 to indicate circuitry corresponding to the block form representations of FIG. 1.

It will be noted that FIG. 2 indicates that two direct current (DC) voltage sources (+150 v. and −150 v.) are employed to drive the circuit with a common ground or return represented by the conventional ground symbol. It will be appreciated that the various signal values may be measured or detected by conventional means, between the electrical points indicated by the reference character and common ground.

Referring particularly to the circuit blocked off and labeled 46, the signal 44 from the IF oscillator (not shown) is applied to the input labeled 44. The resistor-capacitor network 71, 72 serves as a phase shift network to shift the phase of the signal 44 by 45° in one direction. The shifted signal is applied via lead 75 to the grid of tube 76. The capacitor-resistor network 73, 74 serves as a phase shift network to shift the signal 44 by 45° in the other direction. This shifted signal is applied via lead 77 to the grid of tube 78. This network provides two output signals, at the frequency of signal 44, shifted in phase 90° with respect to each other.

Signal 47 is picked off the cathode circuit of tube 76 and applied to the diode mixer 42 of Channel One via the lead 47. Signal 48 is picked off the cathode circuit of tube 78 and is applied to the diode mixer 43 of Channel Two via lead 48. Each signal is individually capacitor coupled, as shown.

The photomixer 30 is represented in part, schematically, as the anode 80 of tube of the photomixer 30 coupled to a preamplifier, block 81. The signal output of the photomixer at 31 is applied to the control grid of a pentode 82 in the amplifier-filter 34. The amplified signal is coupled from the anode circuit of tube 82 to the low-pass filter, network 35, including capacitor 84 and coil 85. The signal output of the low-pass filter is applied via lead 36 to the input of the diode mixer 42 along with the IF signal on 47.

It will be appreciated that the signal at 31 may include low frequency rumble or noise that is not necessarily characteristic of the vibrations or motions not of interest of the target.

Such noise or disturbances may arise, for example, from changes in the refractive index of the air medium through which the optical signal propagates. It may be desirable to attenuate such low frequency noise. This may be accomplished by selecting the values of capacitive-resistive network 63 and 64 so as to substantially attenuate such low frequencies. This may have the effect of increasing the frequency level of the low frequency of the band of frequencies passed by the filter network. The values of the resistive-capacitive network of resistor 65 and capacitor 84 may also be selected so as to effectively control the range of frequency values of the band of frequencies passed, if desired.

It will be noticed that the circuit of the several components of each channel are in conventional form.

It will be appreciated that the optical frequencies included in the signal at 31 are filtered out so that the signal at 36 includes the characteristics of the vibrations of the target found on the echo signal.

The combined signals at 36 and 47 are passed through the mixer diodes 86 and 87 to the primary coil of transformer 88. The mixed signal is induced into the secondary of transformer 88 and applied at 50 to the control grid of pentode 89 of IF amplifier 52. The amplified signal is picked off the plate circuit of tube 89 and applied via lead 54 to the summing network 58.

The signal on lead 55 is developed by Channel Two in the same manner as that described for Channel One. Signal 55 is also applied to the summing network.

The signal 44', which is substantially the same signal as 44, is also applied to the summing network to be added to the signals 54 and 55, the signal 44' to serve as the carrier signal. The summing network, including capacitors 91 and 92, junction 93 and resistor 94, provides an output at junction 56 which output is applied to the control grid of pentode 95 an FM limiter-discriminator driver. The anode circuit of tube 95 includes the primary of the tuned discriminator transformer 96 which together with rectifier tube 97 and its associated filter network performs the desired phase detection.

The output of the discriminator is picked off the cathode circuit of tube 97, the output at 98 being a voltage, the instantaneous value of which is representative of the instantaneous frequency of the echo signal, which is a measure of the instananeous velocity of the vibrating target. The output 98 may be integrated by RC network 60 to give a voltage which varies as the instantaneous position of the vibrating target. The integrator output 99 may be connected to an indicator and/or meter, 61, which may provide an indication and/or record, as for example, by use of a recorder, of the vibrations of the target 20 (shown in FIG. 1).

Thus we have described an optical radar system for detecting and translating vibrations of a remote target which avoids the use of a second local oscillator for providing a reference signal and which includes a dual channel quadrature arrangement, which has reconstructed the optical echo freqeuncy at an intermediate frequency signal. This system has the advantage of overcoming the fold-over problem and avoids the use of complex demodulation of signals at optical frequencies. Obviously, although certain alternate parts of the arrangement presented herein have been suggested, other alternate arrangements including rearrangement and substitution of parts may be made, as will be familiar to those skilled in the art, without departing from the spirit of the invention as defined by the appended claims.

What is claimed is:

1. An optical system for determining the frequency of vibration of a remote body including:
   means for generating and transmitting a generally coherent light energy beam toward the remote body,
   means for receiving reflected light energies from such remote body, said reflected light energies shifted in frequency from the carrier frequency thereof in accordance with the frequency of vibrations of such body, and for providing a signal which is a function of said frequency shift,
   means for isolating said signal,
   means for generating a substantially constant intermediate frequency signal, the frequency of which exceeds the frequency of the largest frequency shift of the reflected light energies,
   means for mixing said isolated signal and the constant intermediate frequency signal for providing a complex signal having intermediate frequency characteristics modulated in frequency in accordance with said frequency shift of the isolated signal,
   a frequency modulation discriminator for detecting the frequency modulation of the intermediate frequency characteristics and for providing an output variable in accordance with such frequency modulation,
   means responsive to said output for providing an indication in accordance with the value of said output so that the indication will vary proportionally to the vibration of the remote body.

2. An optical system for detecting and measuring the frequency of vibration of a remote body including:
   means for generating a continuous coherent electromagnetic wave energy signal and for transmitting said signal to a remote body,
   means for receiving signals so transmitted and reflected from the body, the reflected signal including a characteristics, the value of which is proportional to the frequency of vibration of the remote body,
   means for homodyning a portion of the transmitted signal and the reflected signal for providing a complex signal,
   means for isolating the said characteristic from said complex signal,
   means for generating an intermediate frequency signal the frequency of which is greater than the frequency value of said characteristic included on said reflected signal,
   means for mixing said isolated characteristic and said intermediate frequency signal so that the intermediate frequency signal is modulated in accordance with the characteristic on said reflected signal,
   means for separating the modulation of the modulated intermediate frequency signals,
   means for detecting the modulation of said modulated intermediate signal and for providing an output representing such modulation.

3. An optical system as in claim 2 and in which said output is proportional to the modulation characteristic of said modulated intermediate frequency signal and further including,
   means responsive to said output for providing an indication of the value of said output.

4. An optical system for determining the frequency of vibration of a remote, vibrating body including;
   means for generating and transmitting generally coherent light beam energy to a remote vibrating body,
   means for receiving reflected light energies from such remote, vibrating body and said reflected light energies including thereon energy characteristics representing the frequency of such vibrations,
   means for mixing a portion of the transmitted light energies with the reflected light energies in each each two channels,
   means for attenuating the light energies of the mixed energies and for passing and amplifying the characteristics representing said vibrations, in each of two channels,
   means for generating a substantially constant intermediate frequency signal, the frequency of which exceeds the frequency value of the characteristics representing said vibrations,
   means for providing two intermediate frequency signal outputs in phase quadrature,
   means for mixing said characteristics of one channel with one output of said two intermediate frequency signal outputs,
   means for mixing said characteristics of the other channel with the other output of said two intermediate frequency signal outputs,
   means for summing the outputs of the last two mentioned means for mixing, and for adding said constant intermediate frequency signal as a carrier signal,
   means for demodulating the output of said summing means for providing an output, variable in accordance with the frequency modulation of the output of the summing means,
   means responsive to the output of the demodulating means for providing an indication in accordance with the value of the variable output so that the indication will vary proportionally with the frequency of vibration of the remote, vibrating body.

5. An optical system for determining the frequency of vibration of a remote, vibrating body including;
   means for generating and transmitting generally coherent optical frequency electromagnetic waves to a remote, vibrating body,
   means for receiving reflected electromagnetic waves from such remote vibrating body, said reflected electromagnetic wave including thereon information of the vibrating characteristics of such remote body in terms of amplitude change and phase shift of said optical frequency electromagnetic waves,
   means for homodyning said transmitted optical frequency waves and said reflected waves in a first channel,
   means for homodyning said transmitted optical frequency waves and said reflected waves in a second channel,
   means in each said first and said second channel for extracting and amplifying the amplitude change and extracting the phase shift of said reflected waves, respectively to provide signals indicative thereof,
   means for generating an intermediate frequency signal and for providing at least two intermediate frequency signal outputs shifted in phase with respect to each other,
   means for mixing the signal from said first channel with one intermediate frequency signal output,
   means for mixing the signal from said second channel with the other intermediate frequency signal output,
   means for summing the outputs of the two mixing means and for adding said intermeditae frequency signal thereto as a carrier signal for providing an intermediate frequency signal, frequency modulated in accordance with the phase shift of said reflected electromagnetic waves and amplitude modulated in accordance with the amplitude modulation of said reflected waves, so that the vibrational characteristics are reconstructed in terms of frequency modulation and amplitude modulation at the intermediate frequency signal frequency, means for limiting the amplitude modulation of the output of the summing means, means for demodulating the frequency modulated, limited intermediate frequency signal output for providing an output variable in accordance with the frequency modulation of the modulated intermediate frequency signal, means responsive to the variable output of the demodulating means for providing an indication in accordance with the value of said variable output so that the indication may vary in proportion to the vibration of the remote vibrating body.

6. An optical system as in claim 5 and in which each said means for homodyning includes;
   a photomultiplier having an input and an output,
   means for deflecting part of the transmitted optical frequency electromagnetic waves to said input, and
   means for deflecting part of the reflected electromagnetic waves to said input.

7. An optical system as in claim 5 and in which each said means for homodyning includes;
   a photomultiplier having an input and an output,
   means for deflecting part of the transmitted optical frequency electromagnetic waves to said input,
   means for deflecting part of the reflected electromagnetic waves to said input, and
   means for shifting the phase of one of the deflected transmitted optical frequency electromagnetic waves so that the outputs of the respective photomultipliers are substantially 90° out of phase with respect to each other.

8. An optical system as in claim 5 and in which the frequency of the intermediate frequency signal is substantially higher than the highest frequency of the phase shift on the reflected electromagnetic waves and substantially lower than the frequency of the optical frequency transmitted signal, and
   said two intermediate frequency signal outputs are shifted in phase 90° with respect to each other.

9. An optical receiver for an optical radar system for reconstructing information on reflected optical frequency signals at a substantially lower, intermediate frequency signal level including:
   means for transmitting generally coherent optical frequency signals toward a reflecting surface,
   a first channel for receiving and homodyning a portion of the transmitted optical frequency signal and a portion of the reflected optical frequency signal, and including,
   means for filtering the homodyned signal of said first channel for providing a first output representing the information on the reflected optical frequency signal,
   a second channel for receiving and homodyning another portion of the transmitted optical frequency signal and another portion of the reflected optical frequency signal, and including,
   means for filtering the homodyned signal of said second channel for providing a second output representing the information on the reflected optical frequency signal,
   means for generating and providing an intermediate frequency signal and for further providing two signal outputs equal in frequency to said intermediate frequency signal and displaced 90° in phase with respect to each other,
   means in said first channel for receiving and mixing said first output and one signal output of said two signal outputs,
   means in said second channel for receiving and mixing said second output and the other signal output of said two signal outputs,
   means for summing the mixed signal outputs of each said first channel and said second channel and for adding thereto said intermediate frequency signal as a carrier signal so that the said reflected optical frequency signal is reconstructed at the intermediate frequency signal level and the said information on the reflected optical frequency signal is the frequency modulation of the intermediate frequency signal.

10. A radar receiver for an optical radar system as in claim 9 and in which said receiver further includes;
    means for demodulating the intermediate frequency signal so frequency modulated for providing an output variable in accordance with the frequency modulation characteristic.

11. An optical receiver for an optical radar system for reconstructing information on reflected optical frequency signals at a substantially lower intermediate frequency signal level including:
    means for generating and transmitting generally coherent optical frequency signals toward a reflecting surface,
    a first channel for receiving and homodyning a portion of the transmitted optical frequency signals and a portion of the reflected optical frequency signals, and
    means for filtering the homodyned signal of said first channel for providing a first output representing the information on the reflected optical frequency signal,
    a second channel for receiving and homodyning another portion of the transmitted optical frequency signals and another portion of the reflected optical frequency signals,
    means for filtering the homodyned signal of said second channel for providing a second output representing the information on the reflected optical frequency signal, and
    means for shifting the phase of said other portion of the transmitted optical frequency signal so that the phase of said second output is shifted substantially 90° with respect to the phase of said first output,
    means for generating and providing an intermediate frequency signal and for further providing two signal outputs equal in frequency to said intermediate frequency signal and displaced 90° in phase with respect to each other,
    means in which said first channel for receiving and mixing said first output and one signal output of said two signal outputs,
    means in said second channel for receiving and mixing said second output and the other signal output of said two signal outputs,
    said mixed signal of said first channel and said mixed signal of said second channel having a phase difference of substantially 180°,
    means for summing the mixed signal outputs of said first channel and said second channel and for adding thereto said intermediate frequency signal as a carrier signal so that the said reflected optical signal is reconstructed at the intermediate frequency signal level and the information on the said reflected optical frequency signal is the frequency modulation of such intermediate frequency signal.

12. An optical receiver as in claim 11 and further including,
    means for demodulating said intermediate frequency signal for providing an output representing such frequency modulation.

13. An optical receiver as in claim 12 and in which said output of said demodulation means is variable and proportional to the frequency modulation of said intermediate frequency signal, and further including, means responsive to said output of said demodulation means for providing an indication of the value of such output.

14. An optical receiver for an optical radar system in which generally coherent signals at optical frequencies are generated and transmitted to a body in motion and said transmitted signals are reflected from said body to said receiver, said reflected signals including thereon characteristics related and proportional to the motion of said body, said optical receiver including:

means for homodyne mixing a portion of the transmitted optical frequency signals and a portion of the reflected signals in each of two quadrature channels, each channel further including, means for isolating the characteristics related and proportional to the motion of said body from the homodyned signals provided by each homodyning means respectively, as outputs, means for mixing the isolated characteristics outputs with an intermediate frequency signal, means, common to both channels, for generating said intermediate frequency signal, means, common to both channels, for providing two signals at the frequency of the said intermediate frequency signal, with each signal displaced in phase so as to be 90° out of phase with respect to each other, means for applying one signal of said two signals to the mixing means of one channel of said two quadrature channels and for applying the other signal of said two signals to the mixing means of the other channel of said two quadrature channels, means, common to both channels, for electrically adding the outputs of both said mixing means, and for adding thereto said intermediate frequency signal so as to provide a signal the carrier frequency of which is equal to the frequency of the intermediate frequency signal and frequency modulated in accordance with the characteristics related and proportional to the motion of said body, means for demodulating the signal output of the adding means for providing a signal variable in accordance with the frequency modulation of said signal output of the adding means, means responsive to said variable signal for providing an indication in accordance with the value of said variable signal so that the indication will vary proportionally to the motion of the said body.

15. An optical receiver as in claim 12 and in which one said means for homodyne mixing of one channel of said two quadrature channels includes, means for shifting the phase of the said portion of the transmitted optical frequency signal so that the homodyned signal of one channel is shifted substantially 90° with respect to the homodyned signal of the other channel.

16. An optical receiver for an optical radar system in which generally coherent signals of radiant electromagnetic energies at optical frequencies are generated and transmitted to a body in motion and in which the transmitted signals are reflected from said body to said optical receiver, said reflected signals including thereon characteristics related to and proportional to the motion of said body, said optical receiver including;

a first photomixer for mixing optical frequency signals and having an input and an output, a second photomixer for mixing optical frequency signals and having an input and an output, means for deflecting part of the optical frequency transmitted signals for providing a first reference signal and for directing said first reference signal to said input of said first photomixer, means for deflecting another part of the optical frequency transmitted signals for providing a second reference signal and for directing said second reference signal to said input of said second photomixer, means for deflecting one part of the optical frequency reflected signals to said input of said first photomixer, means for deflecting another part of the optical frequency reflected signals to said input of said second photomixer, said one part of the reflected signals and said other part of the reflected signals having a phase difference of $\theta$ at two selected arbitrary points in the network, means for shifting the phase of said second reference signal by $\theta \pi/2$ so that the phase shift differential between the phase difference between the said first reference signal and said one part of the reflected signal and the phase difference between said second reference signal and said other part of the reflected signals is substantially $\pi/2$ at the said arbitrary points in the network, means for attenuating the optical frequency components from the output signal of the first photomixer, so as to provide a first filtered signal representing the characteristics on said reflected signal, means for attenuating the optical frequency components from the output signal of the second photomixer, so as to provide a second filtered signal representing the characteristics on said reflected signal, means for providing a first intermediate frequency signal, means for providing two signals, substantially equal in frequency to said first intermediate frequency signal and shifted in phase $\pi/2$ with respect to each other, means for mixing said first filtered signal and one signal of said two signals, for providing a first output signal at the intermediate frequency and frequency modulated in accordance with the modulation of said first filtered signal, means for mixing said second filtered signal and the other signal of said two signals, for providing a second output signal at the intermediate frequency and frequency modulated in accordance with the modulation of said second filtered signal, said frequency modulation of said first output signal being substantially 180° out of phase with the frequency modulation of said second output signal, means for summing said first output signal and said second output signal and for adding thereto said first intermediate frequency signal for providing a final frequency modulated intermediate frequency signal, means for demodulating said final frequency modulated signal and for providing a final output which varies in value in accordance with and proportional to the motion of said body.

References Cited

An article entitled, "Proposed Massless Remote Vibration Pickup" by Stewart from "The Journal of the Acoustical Society of America," vol. 30, No. 7, July 1958, pages 644–645.

An article entitled, "Doppler Laser" by Solomon from "Electronics," July 20, 1962, page 26.

An article entitled, "Requirements of a Coherent Laser Pulse-Doppler Radar," by Biernson et al., from "Proceedings of the IEEE," January 1963, pages 202–213.

JAMES J. GILL, *Primary Examiner.*